United States Patent Office 2,852,469
Patented Sept. 16, 1958

2,852,469

HYDROCARBON-SOLUBLE MOLYBDENUM BLUES

Georges Hugel, Ville d'Avray, France, assignor to Institute Francais du Petrole des Carburants et Lubrifiants, Rueil-Malmaison, (Seine-et-Oise), France No Drawing. Application January 7, 1955
Serial No. 480,612

11 Claims. (Cl. 252—49)

The present invention relates to molybdenum blues which are soluble in hydrocarbons.

There are a number of varieties of molybdenum blue which differ from each other by their solubility characteristics. All the known blues are soluble in water, but some of them are also soluble in certain organic solvents such as ethyl alcohol, propyl alcohol, isobutyl alcohol, ether. On the other hand, the known molybdenum blues are insoluble in hydrocarbons and in higher alcohols.

A primary object of the present invention is the embodiment of molybdenum blues which are soluble in hydrocarbons such for example as pentane, hexane, heptane, petroleum ether, mineral oils, etc., and are insoluble in water.

In accordance with the present invention, such hydrocarbon-soluble molybdenum blues are preferably prepared by either of two methods.

In the first of these methods, a molybdenum blue which is soluble in isobutyl alcohol is prepared, for example according to the method of Deniges (C. R. 1927, 184, 687), Duclaux (Rev. Gen. des Colloides 1929, 7, 289) or Guichard (C. R. 1900, 131, 389).

The aqueous solution of the molybdenum blue is extracted with isobutyl alcohol, if necessary with the addition of hydrochloric acid which facilitates the displacement of the blue. The isobutyl alcohol solution is then decanted, dried over magnesium sulfate, and filtered; then an equal quantity of a higher alcohol containing 6 to 12 carbon atoms, for example a $C_{12}$ "oxo" alcohol, i. e. a mixture of normal dodecyl alcohol and α-methyl-undecylicalcohol is added. The isobutyl alcohol is then expelled under the reduced pressure of a suction pump, after which two-thirds of the quantity of added "oxo" alcohol are distilled off. There is thus obtained a concentrated solution of molybdenum blue in the higher alcohol. This molybdenum blue is completely soluble in hydrocarbons such as pentane, hexane, heptane and petroleum ether, and also in higher hydrocarbons such as lubricating oils.

The thus-obtained solutions of molybdenum blue are extremely stable and will withstand temperatures as high as 270° C. without precipitation.

In the second of the aforementioned two methods according to the present invention, the procedure according to Deniges (C. R. 1927, 184, 687) is first followed, in that a solution of disodium phosphate is added to a solution of ammonium molybdate, acidulated with sulfuric acid. The mixture is then heated to boiling and is reduced with the aid of aluminum foil. A very intense blue coloration results. In the absence of added phosphate, no blue coloration would result and the solution would instead take on a very intense brown coloration.

According to the present invention, there is added at the moment of reduction, a phosphorus compound which is insoluble in water and is soluble in hydrocarbons. The molybdenum blue thereupon forms not in the aqueous solution but in the oily layer of phosphorus compound.

It is sufficient under these circumstances to decant and dry the oily layer, thereby to obtain a solution of molybdenum blue which can be diluted to any concentration whatever in hydrocarbons without precipitation taking place.

The two preferred processes are, as described, not intended to be limitative in any sense.

By way of example, in preparing the molybdenum blues according to the second method, the following phosphorus compounds can be employed:

Tri-esters of phosphoric acid with higher alcohols, and corresponding to the formula

wherein R represents an aliphatic radical with 2 to 12 carbon atoms;

Ester-amides of phosphoric acid, corresponding to the formulae

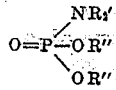

and

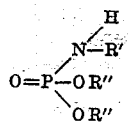

wherein R' and R'' each represents an aliphatic radical with 2 to 12 carbon atoms;

The corresponding compounds of thiophosphoric acid, corresponding to the formulae

and

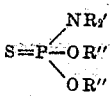

wherein R, R' and R'' each represents an aliphatic radical with 2 to 12 carbon atoms;

Alkyl phosphonates corresponding to the formula

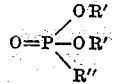

wherein R' and R'' have the previously-indicated significances.

Among others the following phosphorus compounds can be employed in preparing the molybdenum blues according to the second method:

N-diethyl amido dihexyl phosphate
N-diethyl amido diheptyl phosphate
N-diethyl amido dioctyl phosphate
N-diethyl amido didecyl phosphate
N-octyl amido dihexyl phosphate
N-octyl amido diheptyl phosphate
N-octyl amido didecyl phosphate
N-dodecyl amido dihexyl phosphate
N-dodecyl amido diheptyl phosphate
N-dodecyl amido dioctyl phosphate
N-dodecyl amido didecyl phosphate
N-diethyl amido dihexyl thiophosphate
N-diethyl amido diheptyl thiophosphate
N-diethyl amido dioctyl thiophosphate
N-diethyl amido didecyl thiophosphate N-octyl amido dihexyl thiophosphate
N-octyl amido diheptyl thiophosphate
N-octyl amido didecyl thiophosphate
N-dodecyl amido dihexyl thiophosphate
N-dodecyl amido diheptyl thiophosphate
N-dodecyl amido dioctyl thiophosphate
N-dodecyl amido didecyl thiophosphate Phosphorus compounds can also be used in the first aforesaid method for extracting the molybdenum blue from its aqueous solution: it then replaces the isobutyl alcohol.

The following examples further set forth representative embodiments of the present invention. In these examples, parts by weight bear the same relationship to parts by volume as do grams to milliliters. Percentages are by weight.

EXAMPLE 1 (FIRST METHOD)

The following solutions are prepared:

(1) A solution of 5.1 parts by weight of sodium molybdate in 260 parts by volume of water, to which 74 parts by weight of concentrated sulfuric acid are added;

(2) An aqueous solution of 14% strength of crystalline disodium phosphate.

To 300 parts by volume of solution 1, there are added 30 parts by volume of solution 2, and the mixture is heated to boiling. Thereupon 0.3 part by weight of aluminum foil is added, and heating is continued for 4 minutes under reflux. The mixture is then quickly cooled to ambient temperature.

The thus-obtained blue solution is divided into three equal parts.

One of these parts is stirred together with 40 parts by volume of isobutyl alcohol. The upper layer, which contains the molybdenum complex, is separated. The so-obtained alcoholic solution is then stirred together successively with the other two portions. There results a saturated solution of molybdenum blue in isobutyl alcohol, and the extraction is practically total. The last portion of aqueous extract remains slightly blue. The volume of the saturated isobutyl alcohol solution of molybdenum blue is 30 parts (there having been some losses due to the solubility of the isobutyl alcohol in the aqueous acid solution).

To these 30 parts by volume of saturated isobutyl alcohol solution of molybdenum blue, there are added 25 parts by volume of $C_{12}$ "oxo" alcohol, and the mixture is dried over anhydrous magnesium sulfate. The dried solution is then filtered and the isobutyl alcohol expelled under reduced pressure with the aid of a water pump, the temperature being gradually raised on the water-bath up to the boiling point of water. This expulsion step is concluded at a pressure of 1 mm. of mercury. The "oxo" alcohol is then expelled until the residue in the container amounts to 8 parts by weight.

This residue is a thick liquid, dark blue in color, and represents a 33% solution of molybdenum blue in the "oxo" alcohol. It is miscible in all proportions with mineral oil.

EXAMPLE 2 (SECOND METHOD)

To a suspension of 2.5 parts by weight of $MoO_3$ in 25 parts by volume of water, there is added 1 part by weight of powdered molybdenum, and the mixture is heated to boiling for 1 hour in a nitrogen atmosphere. The mixture is then filtered. 0.75 part of the thus-obtained molybdenum blue is extracted with 2.5 parts of diethylamido-bis-n-decyl-phosphate

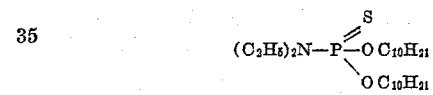

After having caused the molybdenum blue to pass over into the phosphorus compound by the addition of several drops of concentrated hydrochloric acid, the mixture is diluted with n-hexane to facilitate decantation. The hydrocarbon layer containing the molybdenum blue is dried over anhydrous magnesium sulfate, and then the hexane is expelled. There remains a 20% solution of molybdenum blue in the phosphorus compound, which solution is soluble in hydrocarbons.

Method for producing diethylamido-bis-n-decyl-phosphate:

A mixture of 83 parts by weight of n-decyl alcohol and 12.1 parts by weight of sodium is heated to 110–120° C., in a nitrogen atmosphere and while stirring, until a paste is obtained. After cooling this paste to about 35° C., 200 parts by volume of anhydrous ethyl ether are added, stirring and heating under reflux being continued until the sodium disappears. Then, while cooling the reaction product in an ice bath, 45 parts by weight of diethylamido-dichloro-phosphate are added, drop by drop and while stirring. When the alcoholate has completely dissolved, the reaction product is washed with an aqueous solution of sodium carbonate of 50% strength and then with water up to neutrality. After drying over magnesium sulfate and elimination of the ether, there are obtained about 100 parts by weight of diethylamido-bis-n-decyl-phosphate.

EXAMPLE 3 (SECOND METHOD)

A solution of 8 parts of sodium molybdate in 430 parts by volume of water and 62 parts by volume of concentrated sulfuric acid is heated to boiling in a receptacle of 1000 parts by volume capacity surmounted by a reflux condenser. Then 15 parts by weight of diethylamido-bis-n-decyl-thiophosphate $$(C_2H_5)_2N-P\overset{S}{\underset{OC_{10}H_{21}}{\parallel}}-OC_{10}H_{21}$$

and 0.5 part by weight of aluminum foil are added. The boiling temperature is maintained for 7 minutes, after which the reaction mixture is cooled to ambient temperature, for example by plunging the receptacle into a bath of cold water. The oily layer which forms is then separated, washed with 100 parts by volume of water, and dried over magnesium sulfate. There are thus obtained 15 parts by weight of a thick oil containing 20% of molybdic complex.

The diethylamido-bis-n-decyl-thiophosphate can be prepared as follows:

A mixture of 83 parts by weight of n-decyl alcohol and 12.1 parts by weight of sodium is heated to 110–120° C. in a nitrogen atmosphere and while stirring, until a paste is obtained. After cooling this paste to about 35° C., 200 parts by volume of anhydrous ethyl ether are added, stirring and heating under reflux being continued until the sodium disappears. Then, while cooling the reaction product in an ice bath, 50 parts by weight of diethylamido-dichloro-thiophosphate are added, drop by drop and while stirring. When the alcoholate has completely dissolved, the reaction product is washed with an aqueous solution of sodium carbonate of 50% strength and then with water up to neutrality. After drying over magnesium sulfate and elimination of the ether, there are obtained about 100 parts by weight of diethylamido-bis-n-decyl-thiophosphate.

EXAMPLE 4 (SECOND METHOD)

The procedure according to Example 2 is followed, while extracting the molybdenum blue by means of 3.5 parts by weight of the triethylphosphate ester of the formula

After the addition of hydrochloric acid, dilution with n-hexane, drying, elimination of the hexane, there is obtained a 15% solution of molybdenum blue in the phosphorus compound, which solution is hydrocarbon-soluble.

EXAMPLE 5 (SECOND METHOD)

The procedure according to Example 2 is followed, except that the molybdenum blue is extracted by means of 2.5 parts by weight of octylamido-dioctyl-phosphate of the formula

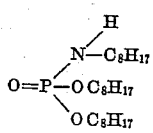

whereupon there is obtained, by following the treatment according to Example 2, a 20% solution of molybdenum blue in the phosphorus compound. This solution is hydrocarbon-soluble.

The process for producing octylamido-dioctyl-phosphate is similar to those described in Examples 2 and 3.

EXAMPLE 6 (SECOND METHOD)

The procedure according to Example 2 is followed, except that the molybdenum blue is extracted by means of 2.5 parts by weight of monodecylamido-bis-n-decyl-phosphate of the formula

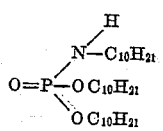

whereupon there is obtained, by following the treatment according to Example 2, a 20% solution of molybdenum blue in the said phosphorus compound. This solution is hydrocarbon-soluble. The process for producing mono-decylamido-bis-n-decylphosphate is analogous to this described in Examples 2 and 3.

EXAMPLE 7 (SECOND METHOD)

The procedure according to Example 2 is followed, except that the molybdenum blue is extracted by means of 2.5 parts by weight of monododecylamido-didodecyl-phosphate of the formula

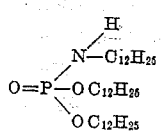

whereupon there is obtained, by following the treatment according to Example 2, a 20% solution of molybdenum blue in the said phosphorus compound. This solution is hydrocarbon-soluble. The process for producing mono-dodecylamido-didodecyl-phosphate is analogous to this described in Examples 2 and 3.

The molybdenum blues obtained according to any one of the foregoing methods of the present invention themselves possess the properties of extreme pressure lubricant dopes and can be used for this purpose. However, these properties are enhanced if there is admixed therewith a sulfur compound which reacts under the conditions of extreme pressure lubrication with molybdenum blue and then precipitates a molybdenum sulfur compound. Sulfur compounds to be used for this purpose are for example benzyl sulfide (which must be used in a proportion of about 4%), benzyl disulfide (to be employed in a proportion of 2%) and xanthates of diols or of glycols, etc. (also to be employed in a proportion of 2%). Such sulfur compounds decompose at temperatures attained by friction, e. g. at temperatures of the order of 180–200° C. The so-obtained products may, if desired, have added thereto suitable chlorine compounds such, for example, as the polychlorinated tertiary butylbenzenes which are described in French Patent n°. 1,060,714.

By way of example, use may be made of a mineral oil, S. A. E. 30, having a viscosity of 54 centipoises at 50° C. and containing 1% of molybdenum blue prepared according to the present invention ($MoO_2.4MoO_3$) to which has been added 2% of the dibenzyl-xanthate of glycol. This solution heated to a temperature of about 320° C. leaves about 1% of a dark-brown compound of $MoS_2O$. The latter which is left on metallic surfaces under condition of lubrication leads to remarkable performances. The thus-obtained product performs remarkably as an extreme pressure lubricant. This is demonstrated for example by tests on the so-called "four-ball machine" (described by Boerlage in "Engineering," July 14, 1953, page 46) as shown by the following tabulated results:

*Results of tests on "four-ball machine"*

| Load applied in Kg. | Delay in Seizing in seconds | End of Seizing | Coefficient of Friction | | | Diameter of Deformation in min. |
|---|---|---|---|---|---|---|
| | | | Before Seizing | Maximum | After Seizing | |
| Mineral Oil S. A. E. 30 (viscosity at 50° C.=54 centipoises) | | | | | | |
| 120 | 2 | 8.6 | 0.08 | 0.52 | 0.07 | 2.1 |
| 150 | 2.5 | 11.4 | 0.08 | 0.59 | 0.07 | 3.2 |
| Same Oil containing 1% Molybdenum Blue | | | | | | |
| 140 | >60 | | 0.09 | | | 0.45 |
| 180 | >60 | | 0.08 | | | 0.52 |
| 190 | >60 | | | | | |
| 200 | >60 | | 0.08 | | | 0.6 |
| 200 | >60 | | 0.08 | | | 0.61 |
| 210 | >60 | | 0.09 | | | 0.63 |
| 210 | >60 | | 0.09 | | | 0.64 |
| 220 | 0.3 | 3.2 | 0.08 | 0.37 | 0.06 | 2.2 |
| 220 | 0.4 | 4.5 | 0.1 | 0.48 | 0.07 | 2.3 |

*Note.*—The tests were carried out while renewing the balls each time. The use of the balls which had served for previous tests and applying progressively increasing loads, would have made it possible, as a result of the continual deposit on the balls of a layer of molybdenum compound, to attain much higher pressures without seizure.

Having thus disclosed the invention, what is claimed is:

1. A method of preparing a liquid-hydrocarbon-soluble solution of molybdenum blue in a phosphorus compound, which comprises reducing an acidulated solution of alkaline molybdate solution with aluminum in the presence of a phosphorus compound which is insoluble in water and soluble in hydrocarbons and is selected from the group consisting of phosphoric acid tri-esters of the formula

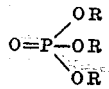

wherein R represents an aliphatic radical with 2 to 12 carbon atoms, phosphoric acid ester-amides of the formula

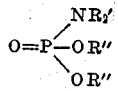

where $R_2'$ and $R''$ each represents an aliphatic radical with 2 to 12 carbon atoms, phosphoric acid ester-amides of the formula

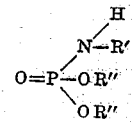

wherein $R'$ and $R''$ each represents an aliphatic radical with 2 to 12 carbon atoms, thiophosphoric acid tri-esters of the formula

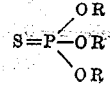

wherein R represents an aliphatic radical with 2 to 12 carbon atoms, thiophosphoric acid ester-amides of the formula

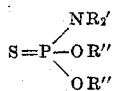

wherein $R_2'$ and $R''$ each represents an aliphatic radical with 2 to 12 carbon atoms, an alkyl phosphonates of the formula

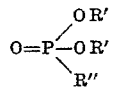

wherein $R'$ and $R''$ each represents an aliphatic radical with 2 to 12 carbon atoms, and then decanting and drying the oily layer of phosphorus compound.

2. A solution of molybdenum blue in a phosphorus compound which is insoluble in water and soluble in hydrocarbons and is selected from the group consisting of phosphoric acid tri-esters of the formula

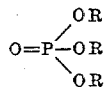

wherein R represents an aliphatic radical with 2 to 12 carbon atoms, phosphoric acid ester-amides of the formula

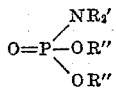

wherein $R'$ and $R''$ each represents an aliphatic radical with 2 to 12 carbon atoms, phosphoric acid ester-amides of the formula

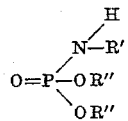

wherein $R'$ and $R''$ each represents an aliphatic radical with 2 to 12 carbon atoms, thiophosphoric acid tri-esters of the formula

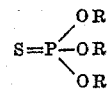

wherein R represents an aliphatic radical with 2 to 12 carbon atoms, thiophosphoric acid ester-amides of the formula

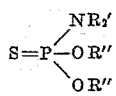

wherein $R_2'$ and $R''$ each represents an aliphatic radical with 2 to 12 carbon atoms, and alkyl phosphonates of the formula

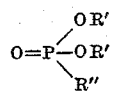

wherein $R'$ and $R''$ each represents an aliphatic radical with 2 to 12 carbon atoms, said solution being miscible with liquid hydrocarbons in all proportions.

3. A method of preparing a liquid-hydrocarbon-soluble solution of molybdenum blue in a phosphorus compound, which comprises reducing an acidulated solution of alkaline molybdate solution with aluminum in the presence of diethylamido-bis-n-decyl phosphate:

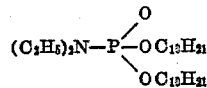

and then decanting and drying the oily layer of phosphorus compound.

4. A method of preparing a liquid-hydrocarbon-soluble solution of molybdenum blue in a phosphorus compound, which comprises reducing an acidulated solution of alkaline molybdate solution with aluminum in the presence of diethyl-amido-bis-n-decyl-thiophosphate:

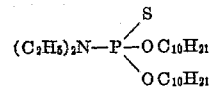

and then decanting and drying the oily layer of phosphorus compound.

5. A method of preparing a liquid-hydrocarbon-soluble solution of molybdenum blue in a phosphorus compound, which comprises reducing an acidulated solution of alkaline molybdate solution with aluminum in the presence of the triethylphosphate ester:

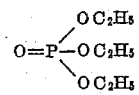

and then decanting and drying the oily layer of phosphorus compound.

6. A method of preparing a liquid-hydrocarbon-soluble solution of molybdenum blue in a phosphorus compound, which comprises reducing an acidulated solution of alkaline molybdate solution with aluminum in the presence of octylamido-dioctyl-phosphate:

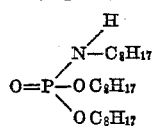

and then decanting and drying the oily layer of phosphorus compound.

7. A method of preparing a liquid-hydrocarbon-soluble solution of molybdenum blue in a phosphorus compound, which comprises reducing an acidulated solution of alkaline molybdate solution with aluminum in the presence of monodecylamido-bis-n-decyl phosphate:

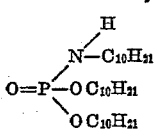

and then decanting and drying the oily layer of phosphorus compound.

8. A method of lubricating metallic parts consisting essentially in coating the said parts with a mineral oil containing a liquid-hydrocarbon-soluble solution of molybdenum blue in a phosphorus compound selected from the group consisting of phosphoric acid tri-esters of the formula

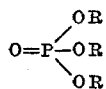

wherein R represents an aliphatic radical with 2 to 12 carbon atoms, phosphoric acid ester-amides of the formula

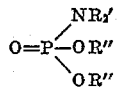

wherein $R_2'$ and $R''$ each represents an aliphatic radical with 2 to 12 carbon atoms, phosphoric acid ester-amides of the formula

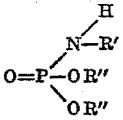

wherein $R'$ and $R''$ each represents an aliphatic radical with 2 to 12 carbon atoms, thiophosphoric acid tri-esters of the formula

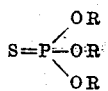

wherein R represents an aliphatic radical with 2 to 12 carbon atoms, thiophosphoric acid ester-amides of the formula

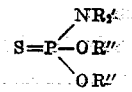

wherein $R_2'$ and $R''$ each represents an aliphatic radical with 2 to 12 carbon atoms, and alkyl phosphonates of the formula

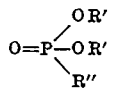

wherein $R'$ and $R''$ each represents an aliphatic radical with 2 to 12 carbon atoms.

9. A method of lubricating metallic parts consisting essentially in coating the said parts with a mineral oil containing a liquid-hydrocarbon-soluble solution of molybdenum blue in a phosphorus compound selected from the group consisting of phosphoric acid tri-esters of the formula

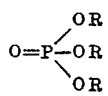

wherein R represents an aliphatic radical with 2 to 12 carbon atoms, phosphoric acid ester-amides of the formula

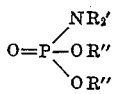

wherein $R_2'$ and $R''$ each represents an aliphatic radical with 2 to 12 carbon atoms, phosphoric acid ester-amides of the formula

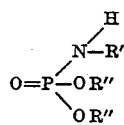

wherein $R'$ and $R''$ each represents an aliphatic radical with 2 to 12 carbon atoms, thiosphosphoric acid tri-esters of the formula

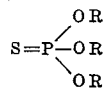

wherein R represents an aliphatic radical with 2 to 12 carbon atoms, thiophosphoric acid ester-amides of the formula

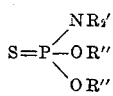

wherein $R_2'$ and $R''$ each represents an aliphatic radical with 2 to 12 carbon atoms, and alkyl phosphonates of the formula

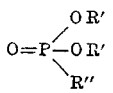

wherein $R'$ and $R''$ each represents an aliphatic radical with 2 to 12 carbon atoms, the quantity of molybdenum blue in said mineral oil amounting to about 1% by weight.

10. A method of lubricating metallic parts consisting essentially in coating the said parts with a mineral oil containing benzyl sulfide and a liquid-hydrocarbon-soluble solution of molybdenum blue in a phosphorus compound selected from the group consisting of phosphoric acid tri-esters of the formula

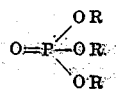

wherein R represents an aliphatic radical with 2 to 12 carbon atoms, phosphoric acid ester-amides of the formula

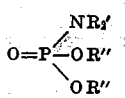

wherein $R_2'$ and $R''$ each represents an aliphatic radical with 2 to 12 carbon atoms, phosphoric acid ester-amides of the formula

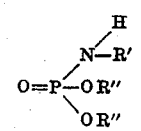

wherein $R'$ and $R''$ each represents an aliphatic radical with 2 to 12 carbon atoms, thiophosphoric acid tri-esters of the formula

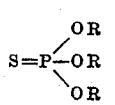

wherein R represents an aliphatic radical with 2 to 12 carbon atoms, thiophosphoric acid ester-amides of the formula

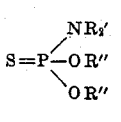

wherein $R_2'$ and $R''$ each represents an aliphatic radical with 2 to 12 carbon atoms, and alkyl phosphonates of the formula

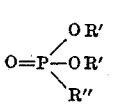

wherein $R'$ and $R''$ each represents an aliphatic radical with 2 to 12 carbon atoms.

11. A lubricant comprising a mineral oil containing a liquid-hydrocarbon-soluble solution of molybdenum blue being in a phosphorus compound selected from the group consisting of phosphoric acid tri-esters of the formula

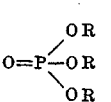

wherein R represents an aliphatic radical with 2 to 12 carbon atoms, phosphoric acid ester-amides of the formula

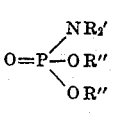

wherein $R_2'$ and $R''$ each represents an aliphatic radical with 2 to 12 carbon atoms, phosphoric acid ester-amides of the formula

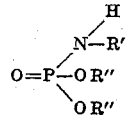

wherein $R'$ and $R''$ each represents an aliphatic radical with 2 to 12 carbon atoms, thiophosphoric acid tri-esters of the formula $$S=P\begin{matrix}OR\\-OR\\OR\end{matrix}$$

wherein R represents an aliphatic radical with 2 to 12 carbon atoms, thiophosphoric acid ester-amides of the formula $$S=P\begin{matrix}NR_2'\\-OR''\\OR''\end{matrix}$$

wherein $R_2'$ and R'' each represents an aliphatic radical with 2 to 12 carbon atoms, and alkyl phosphonates of the formula $$O=P\begin{matrix}OR'\\-OR'\\R''\end{matrix}$$

wherein R' and R'' each represents an aliphatic radical with 2 to 12 carbon atoms.

References Cited in the file of this patent
UNITED STATES PATENTS
2,629,691  Peterson _____ Feb. 24, 1953